Figure 1:
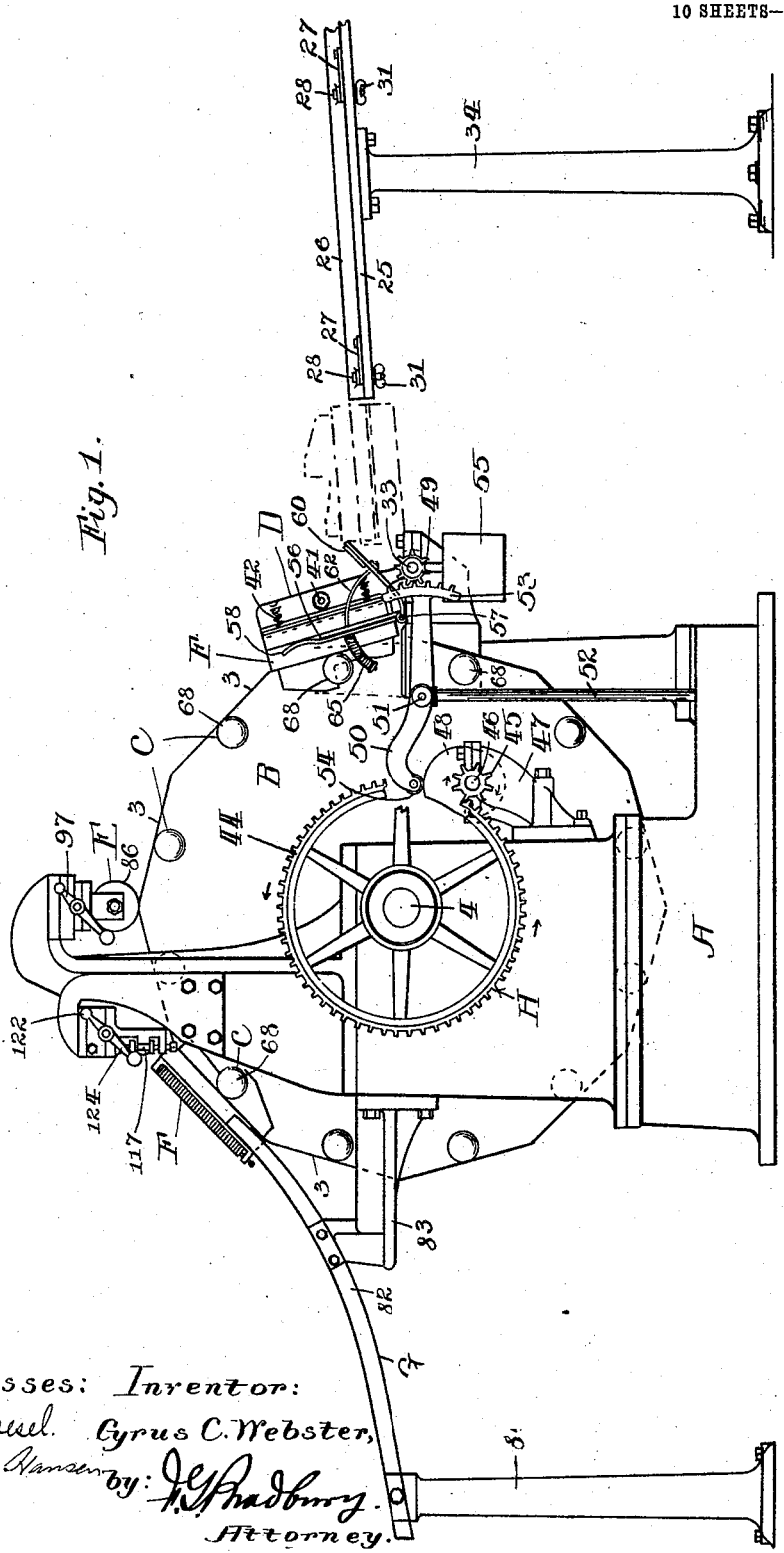

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.

10 SHEETS—SHEET 1.

Witnesses:
E. M. Boesel.
K. A. Hansen.

Inventor:
Cyrus C. Webster,
by J. C. Bradbury.
Attorney.

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.

10 SHEETS—SHEET 3.

Witnesses:
E. M. Boesel.
K. H. Hansen.

Inventor:
Cyrus C. Webster,
by H. L. Bradbury,
Attorney.

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.

10 SHEETS—SHEET 4.

Witnesses:
E. M. Boesel.
K. K. Hansen.

Inventor:
Cyrus C. Webster,
by: J. G. Bradbury
Attorney.

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.
10 SHEETS—SHEET 5.
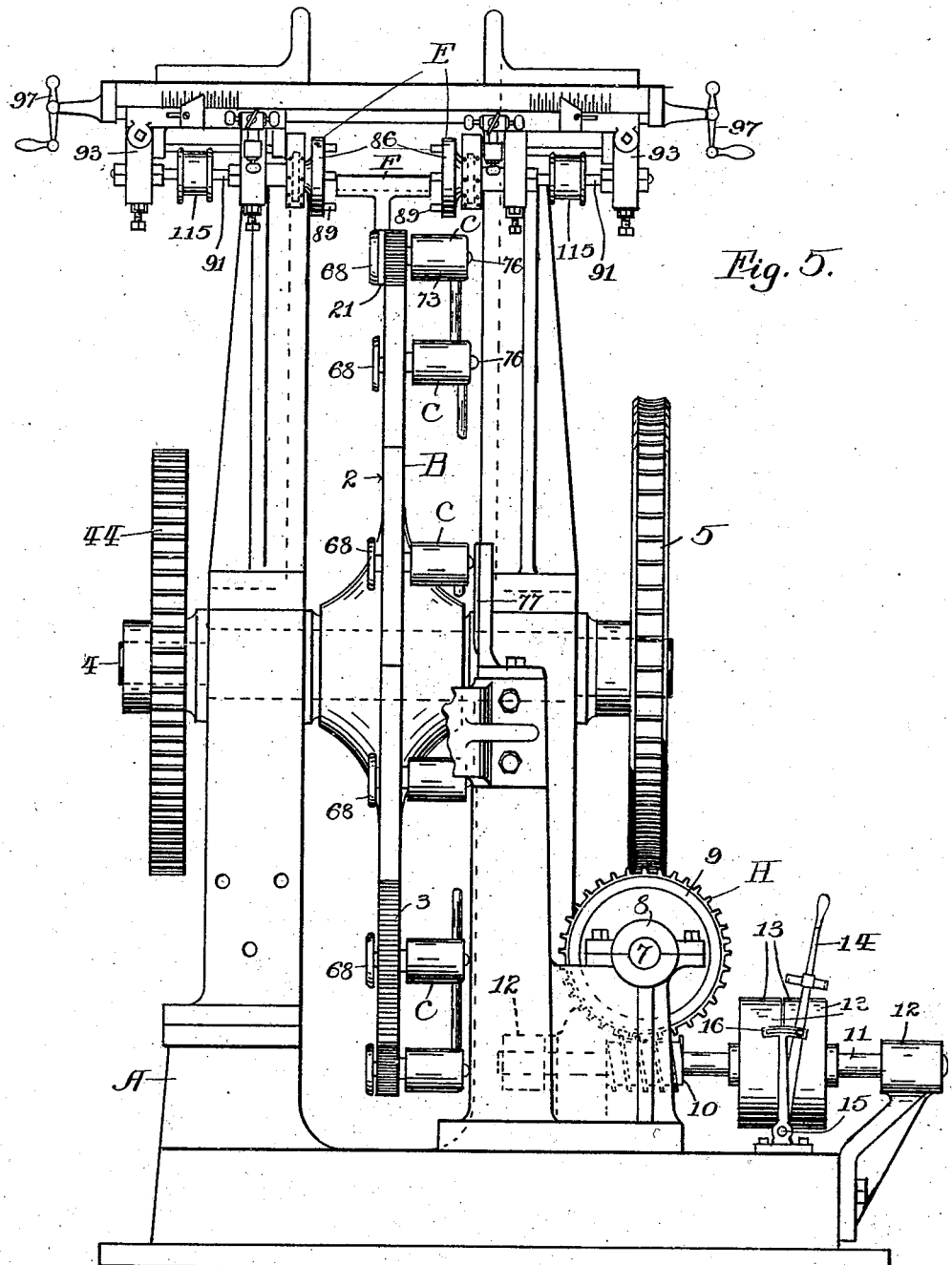

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.
10 SHEETS—SHEET 6.
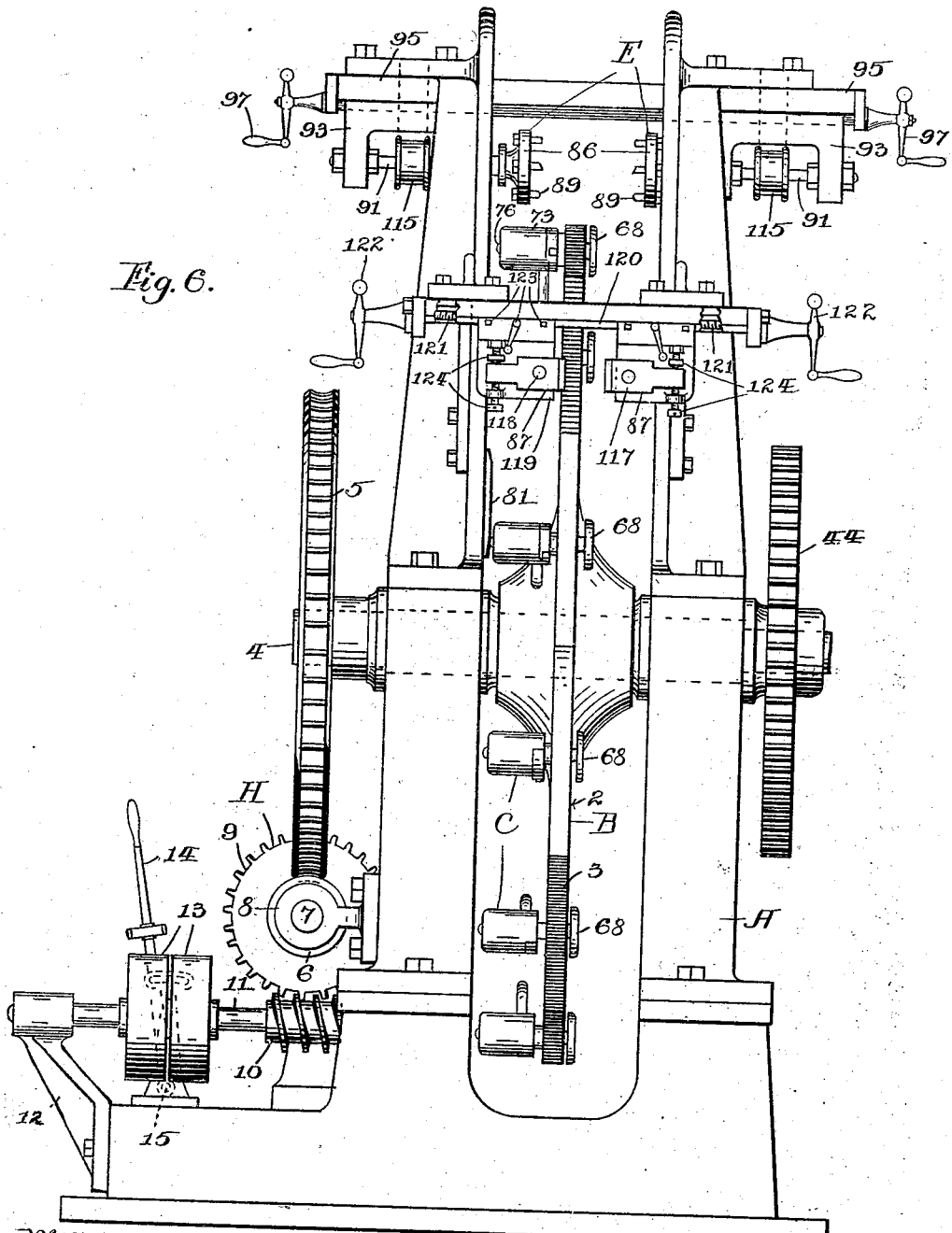

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.
10 SHEETS—SHEET 7.
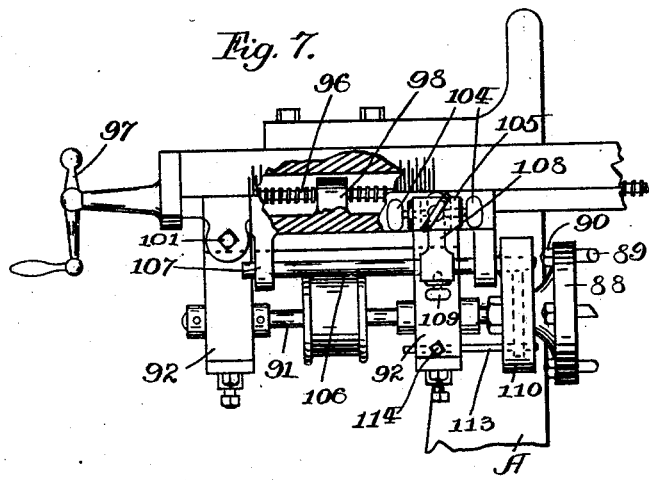
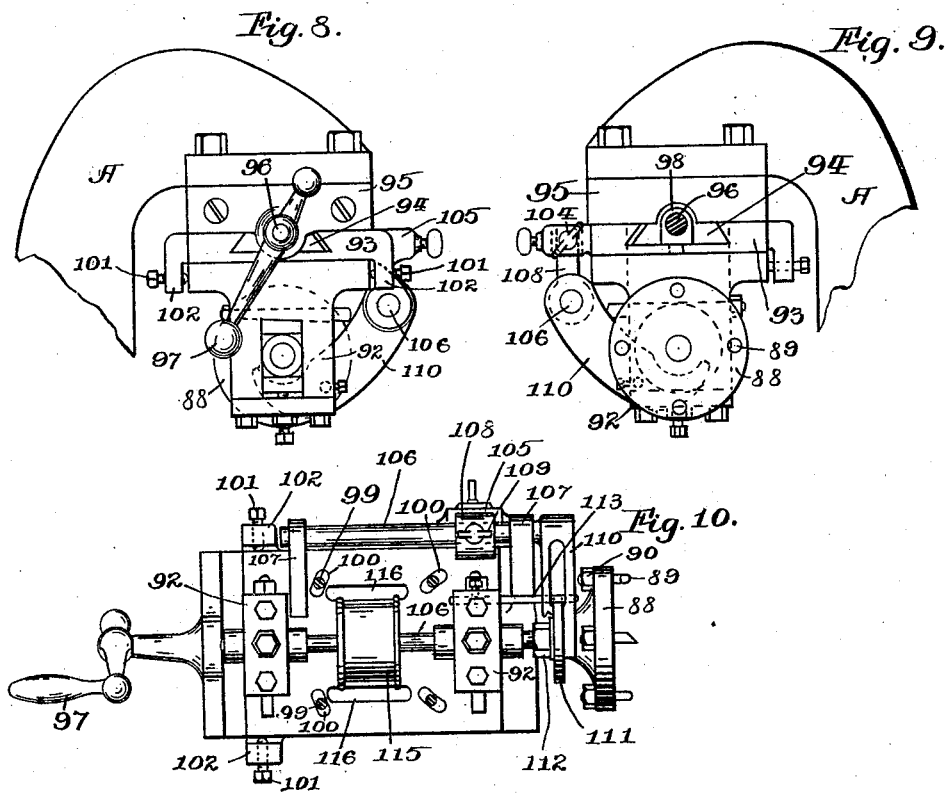
Witnesses:
E. M. Boesel.
K. H. Hansen.
Inventor:
Cyrus C. Webster
by H. G. Rodbury
Attorney.

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.
10 SHEETS—SHEET 8.
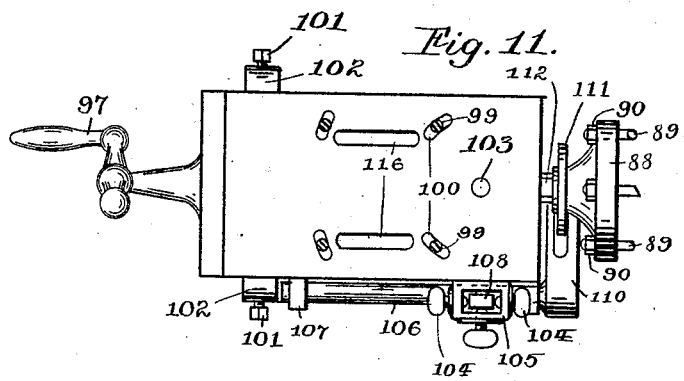
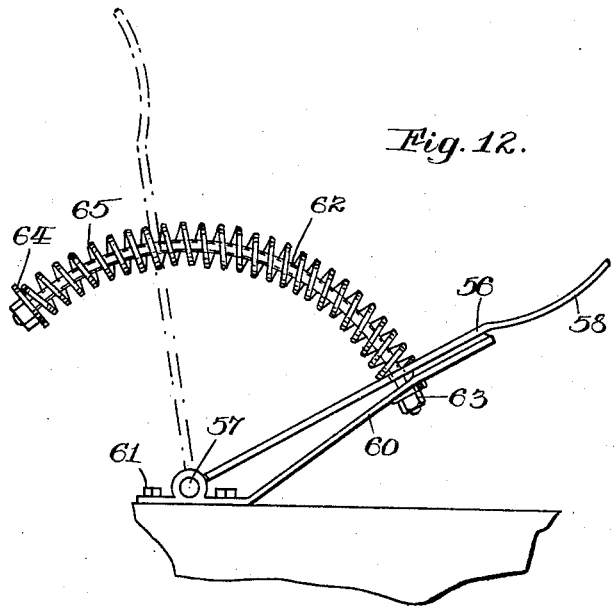

No. 842,842. PATENTED JAN. 29, 1907.
C. C. WEBSTER.
MACHINE FOR FINISHING PRINTERS' LEADS.
APPLICATION FILED DEC. 7, 1904. RENEWED DEC. 26, 1906.
10 SHEETS—SHEET 9.
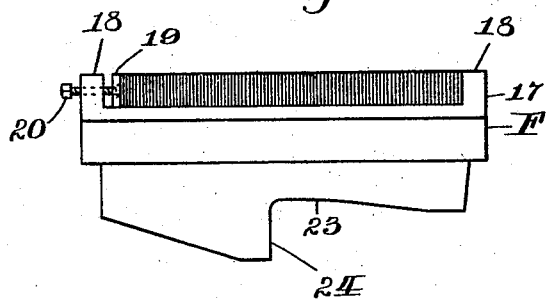
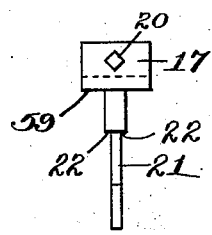
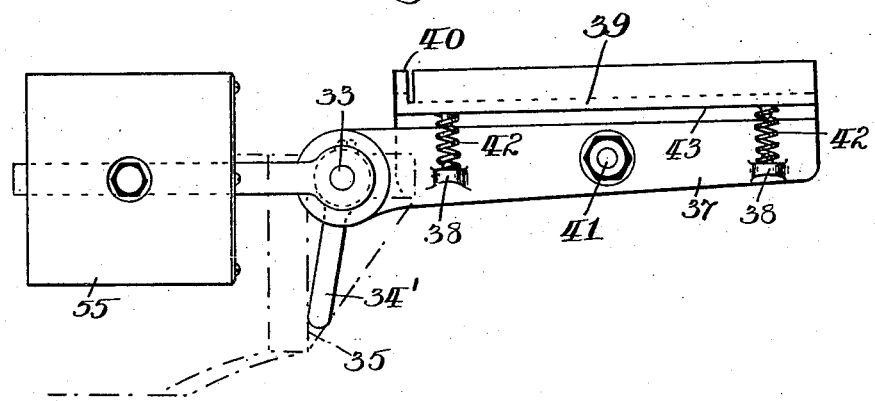
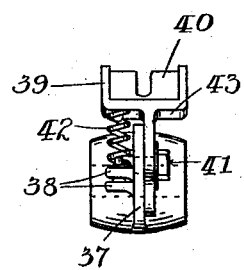
Witnesses:
E. M. Boesel.
K. A. Hansen.
Inventor:
Cyrus C. Webster,
by: W. G. Bradbury.
Attorney.

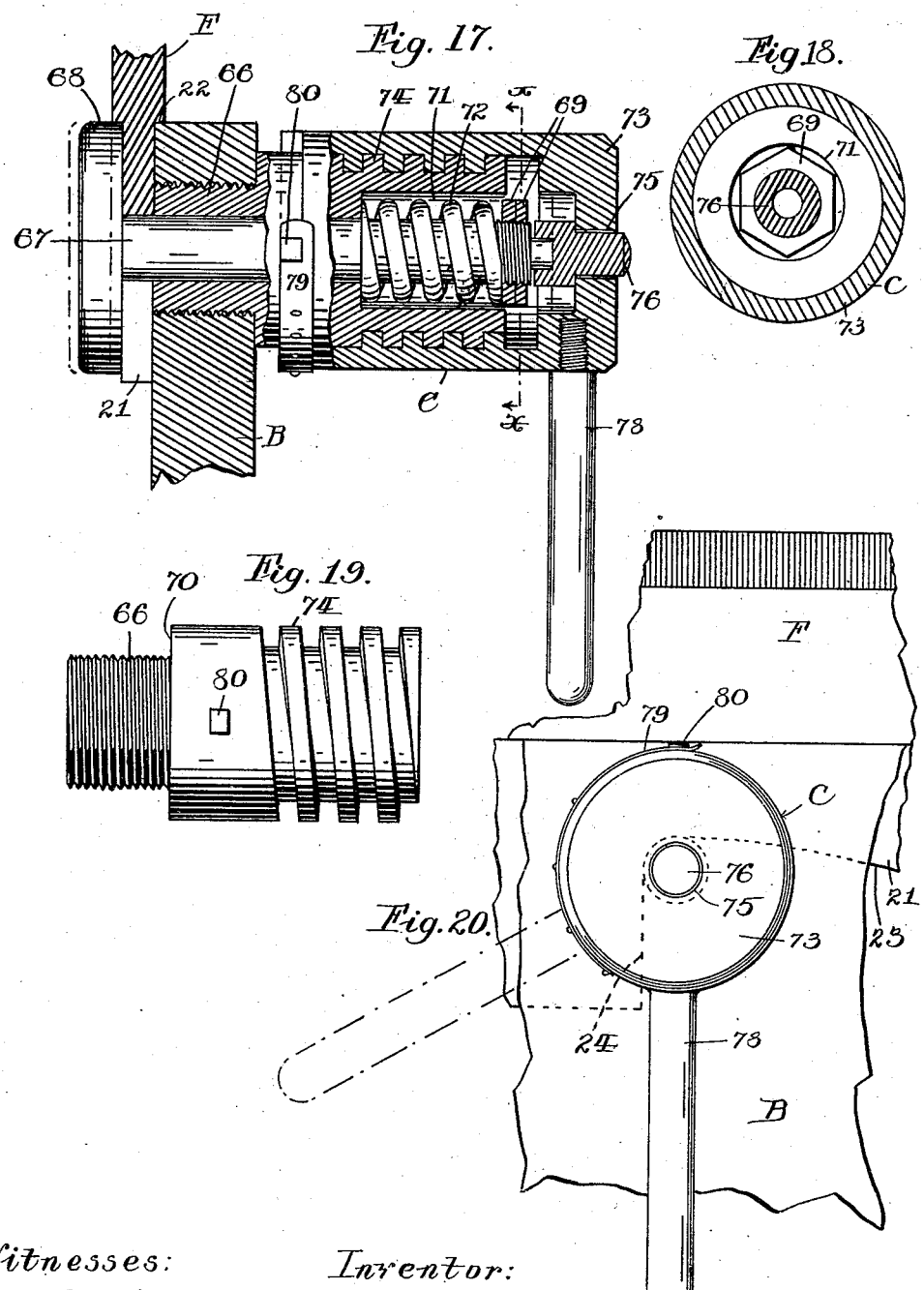

UNITED STATES PATENT OFFICE.

CYRUS C. WEBSTER, OF MINNEAPOLIS, MINNESOTA, ASSIGNOR TO AMERICAN TYPE FOUNDERS COMPANY, A CORPORATION OF NEW JERSEY.

MACHINE FOR FINISHING PRINTERS' LEADS.

No. 842,842.   Specification of Letters Patent.   Patented Jan. 29, 1907.

Application filed December 7, 1904. Renewed December 26, 1906. Serial No. 349,442.

*To all whom it may concern:*

Be it known that I, CYRUS C. WEBSTER, a citizen of the United States, residing at Minneapolis, in the county of Hennepin and State of Minnesota, have invented a new and useful Machine for Finishing Printers' Leads, of which the following is a specification.

My invention relates to improvements in machines for finishing printers' leads, and has for its object to provide means for cutting and smoothing the ends of a plurality of pieces of metal with a minimum amount of labor and expense and for holding said pieces after they have been finished ready to be packed without sorting or rearranging.

By the use of my invention the amount of hand-labor necessary for finishing the leads is reduced and a lead of superior finish and exact dimensions produced.

Where I use the terms "leads" or "a stack of leads" throughout this specification and the claims following the same, I mean to include pieces or a stack of pieces of any suitable material.

Figure 2:
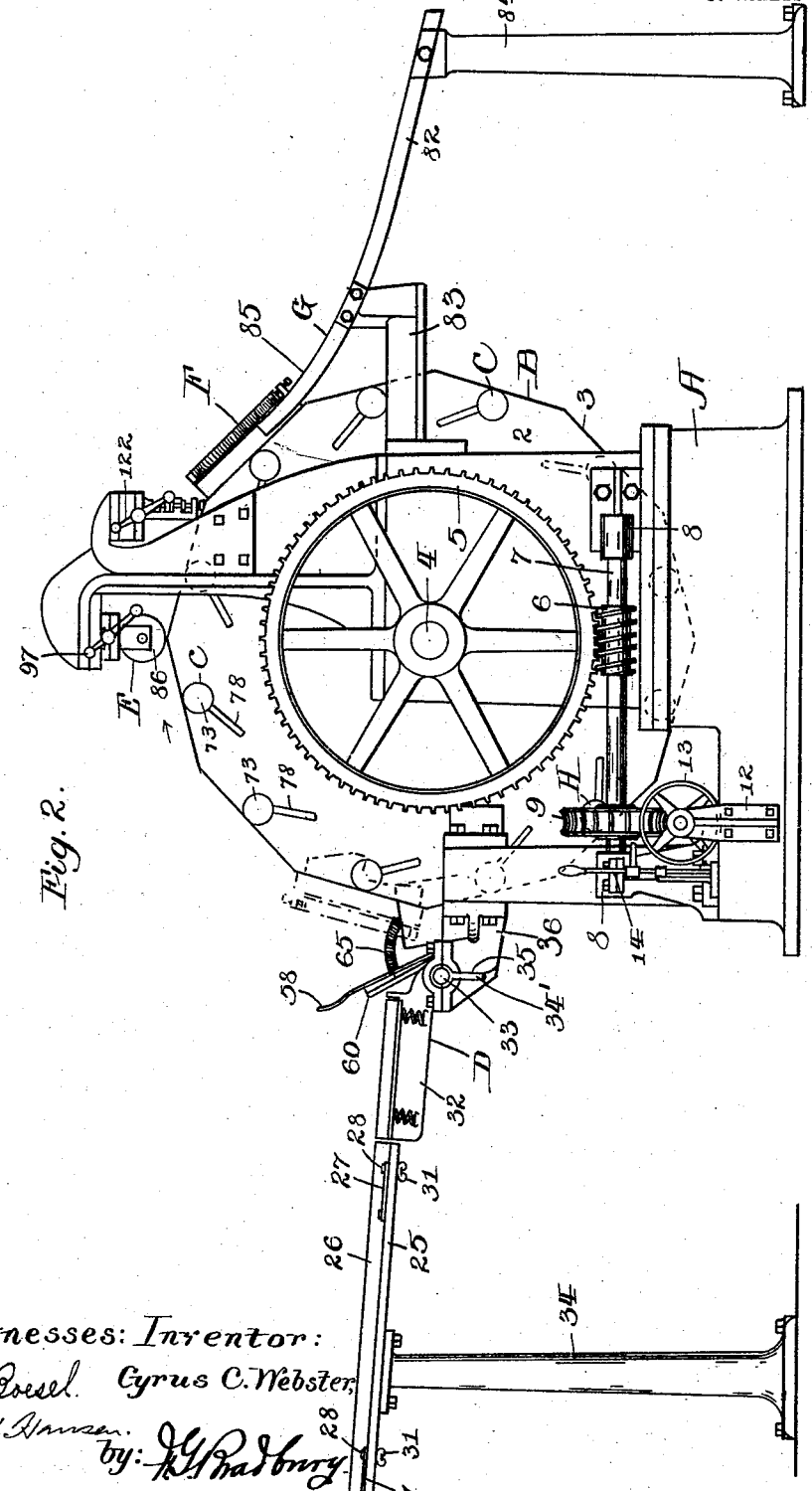
Figure 3:
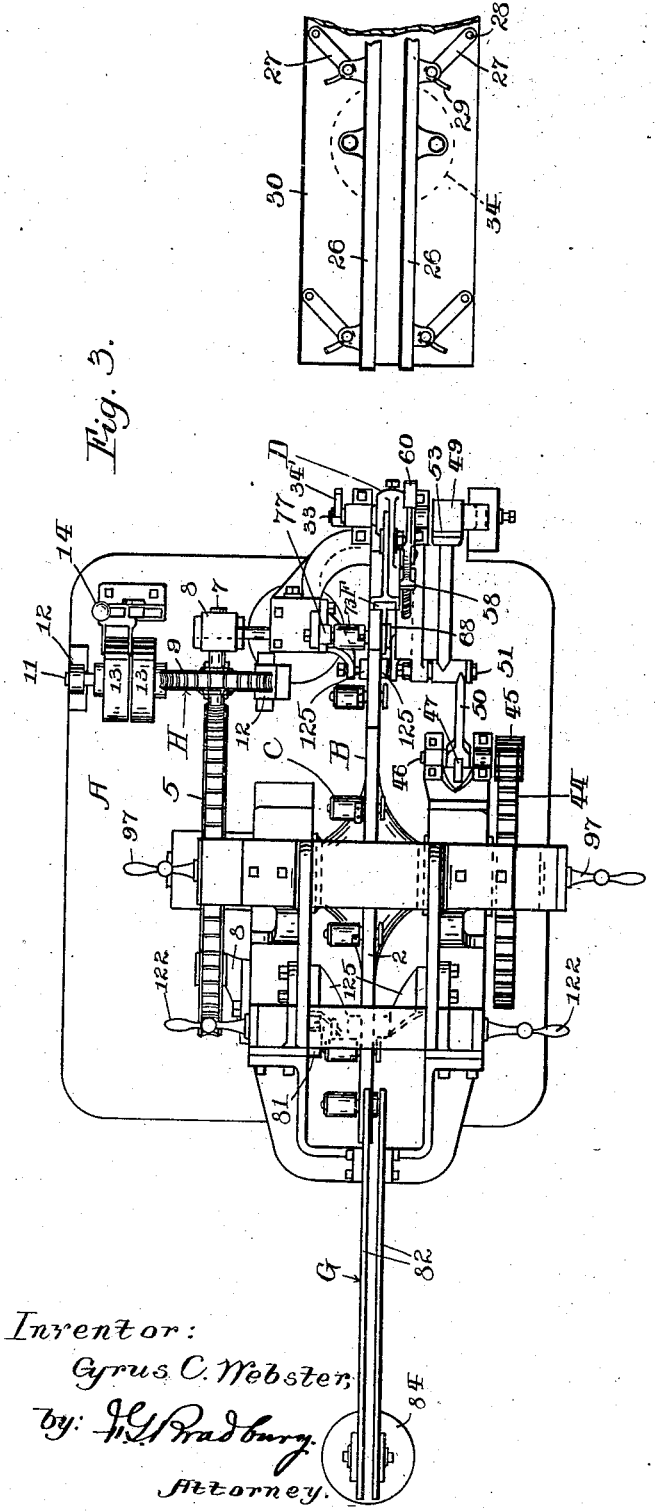
Figure 4:
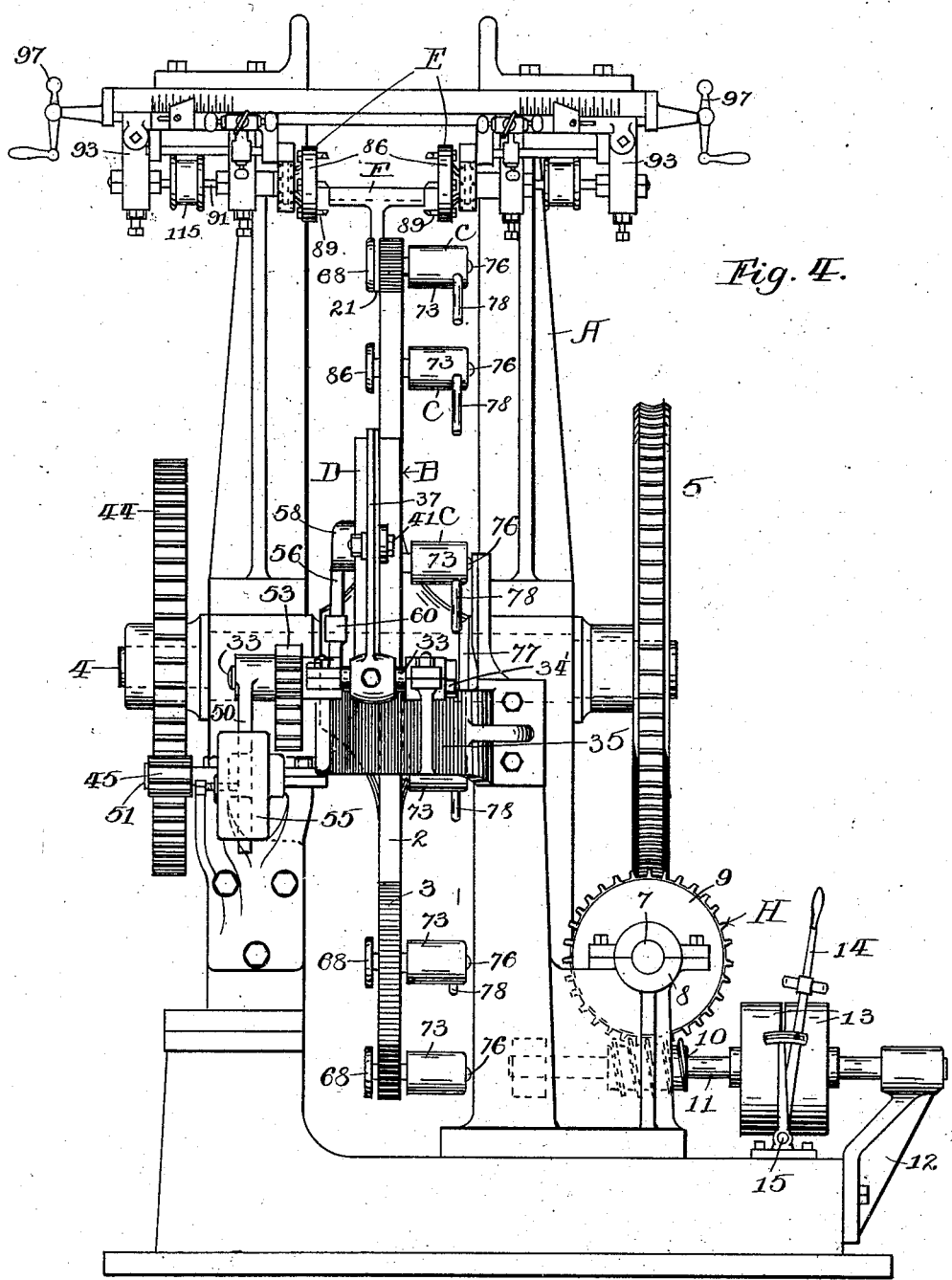

In the accompanying drawings, forming part of this specification, Figure 1 is a side elevation. Fig. 2 is another elevation looking at the other side of the machine. Fig. 3 is a plan view. Fig. 4 is an enlarged end elevation. Fig. 5 is a view similar to Fig. 4, showing the feed mechanism removed. Fig. 6 is an elevation looking at the other end of the machine with the cut-out removed. Fig. 7 is an enlarged elevation, partly in section, of one of the rotary cutters and its adjusting mechanism. Figs. 8 and 9 are end views of Fig. 7. Fig. 10 is a view looking up at one of the rotary cutters, showing part of its adjusting mechanism removed from the supporting-frame. Fig. 11 is a view looking down on one of the rotary cutters, showing its adjusting mechanism removed from the supporting-frame. Fig. 12 is an enlarged detail view of part of the feed mechanism. Fig. 13 is another detail view of the feed mechanism. Fig. 14 is an end view of Fig. 13. Figs. 15 and 16 are views of one of the clamps or holders for a stack of printers' leads which are finished by this machine. Fig. 17 is a longitudinal section of one of the locks by which the holders are held upon the carrier. Fig. 18 is a sectional view of Fig. 17, taken on the line X X; and Figs. 19 and 20 are detail views of said lock.

In the drawings let A represent the frame of the machine; B, the carrier; C, the locks on the carrier; D, the feed mechanism; E, the trimming mechanism; F, the holders for the leads to be finished; G, the cut-out, and H the actuating mechanism.

The carrier is a vertical plate 2, provided with a plurality of flat peripheral faces 3 and mounted upon the horizontal shaft 4, which is journaled in said frame. The carrier-plate is revolved in the direction of the arrows by means of the screw-gear 5 on the shaft 4 and meshing with the screw-pinion 6, which is carried by the shaft 7. This shaft in turn is journaled in the bearings 8 and carries a screw-gear 9, which meshes with the screw-pinion 10 on the drive-shaft 11. The drive-shaft is journaled in the bearings 12 on the frame and carries the tight and loose pulleys 13, which may be connected by a belt with any suitable source of power, said belt being shifted from one pulley to the other by means of the lever 14, pivoted at 15, and traveling in the segment 16 to limit the movement thereof.

In use I preferably employ a holder or clamp F, as shown in Figs. 15 and 16, similar in construction to the holder or clamp described in my Patent No. 812,708, dated February 13, 1906, for machine for manufacturing printers' leads. This holder has a body 17, shoulders 18, clamp-plate 19, and adjusting-bolt 20, by which the clamp-plate is set to hold a stack of pieces of leads after they have been cut from strips by the machine described in the application above referred to. Depending from the body 17 is a rib or tenon 21, having shoulders 22 and cut away at 23 to form a stop 24 for the purposes hereinafter described. A series of these holders is adapted to be fed successively, one holder to each flat peripheral face 3 of the carrier-plate, by the mechanism D. The holders are first placed between the guides 26 on the guideway 25 with their ribs 21 turned up. The guides may be adjusted to the width of the body 17 by means of the links 27, which are pivoted at 28 to work in the slots 29 and turn on the supporting-plate 30. The pivots are locked, when adjusted, by the thumb-nuts 31.

A feeder 32 is carried by the shaft 33, and when in lowered position, as shown by the full lines in Fig. 2, receives a holder at a time from the guideway, which is supported by the pedestal 34 and inclines down toward the open end of the feeder, as shown in the drawings. The shaft 33 carries a stop 34', which impinges against the face 35 of the bracket 36 on the frame to limit the movement of the feeder.

The feeder consists of an arm 37, on the side of which are ears 38. A justifier 39, of trough-like form upon its upper end and closed by the wall 40 at its lower end, is pivoted by the bolt 41 on the arm 37. A pair of springs 42 between the shoulder 43 on the justifier and the ears 38 on the arm 37 permits the justifier to swing on the bolt 41. When in superior position, the feeder is in the full-line position shown in Fig. 1 and the holder supported by the justifier rests with its shoulder 22 upon one of the flat peripheral faces of the carrier-plate, the springs 42 causing the holder to register exactly in place. The feeder is operated by means of the gear 44 on the shaft 4 and meshing with the pinion 45 on the counter-shaft 46. This counter-shaft is journaled in the bracket 47 on the frame and carries a cam 48. A pinion 49 on the shaft 33 is operatively connected with the cam 48 by means of the lever 50, which is fulcrumed by the pivot 51 on the standard 52 and has on one end a toothed segment 53, meshing with the pinion 49, and upon its opposite end an antifriction-roller 54, which bears upon the working surface of the cam 48. A counterweight 55 is carried by the shaft 33 and more than counterbalances the weight of the feeder. This counterweight returns the feeder to normal position. An arm 56 is pivoted upon the frame at 57, and its upper end 58 is adapted to impinge against the shoulder 59 on the holder to prevent said holder tipping out of the justifier as it approaches a flat peripheral face on the carrier. A reclining support 60, fastened on the frame by the bolt 61, as shown in Fig. 12, limits the swinging movement of the arm 56 in one direction and carries near one end thereof a curved rod 62, concentric with the pivot 57 and fastened by the nut 63 on the reclining support. A coiled expansion-spring 65, impinging between the arm 56 and stop 64 on the other end of the rod 62, tends to swing said arm against said reclining support. The mechanism by which the feeder places a holder on each flat peripheral face of the carrier, coacting with the counterweight 55, returns said feeder to normal position in readiness to receive another holder and in turn places the succeeding holder upon the succeeding flat peripheral face of the carrier. This operation continues as the carrier revolves.

Upon the carrier-plate and adjoining each flat peripheral face thereof is a lock C, which is operated automatically to open and close or may be operated by hand when desired. This lock consists of a bushing 66, which is threaded into the carrier-plate, as shown in Fig. 17. Through this bushing slides a shaft 67, upon one end of which and on one side of the carrier-plate is a head 68, and upon its other end is threaded a pair of lock-nuts 69. The bushing 66 has a shoulder 70, which impinges against the side of the carrier-plate opposite that on which the head 68 projects. The bushing has a recess 71, between the inner end of which and the lock-nuts is placed an expansion-spring 72, the tendency of which is to draw the head 68 against the face of the carrier-plate and clamp the rib of the holder against said carrier. A cover 73 is fastened, but may be turned on the bushing 66, by means of the intermeshing threads 74 and has an opening 75, through which a button 76 projects. This button is preferably case-hardened to reduce wear and as the carrier revolves impinges against a cam-shoulder 77 (see Fig. 3) to open said lock by pushing against the end of the shaft 67 and receive the rib of the holder. As the carrier continues revolving the button 74 slides off of the cam-shoulder and the head 68 recedes. The rib of the holder is cut away at 23 to form a shoulder 24, so as to engage the shaft 67 and assist in securing the holder on the carrier. When it is desired to remove a holder by hand from the carrier, a spring 79, which engages the pin 80 on the bushing to make operative connection between these parts, is raised and the cover turned by the handle 78 into the broken-line position shown in Fig. 20. This operation screws the cup down upon the bushing and presses against the end of the shaft, thus sliding it through the carrier and releasing the holder. The holders are released from the carrier automatically by an unlocking cam-shoulder 81 on the frame after the trimming mechanism has finished the ends of the leads in the holder and the cut-out is about to remove said released holders. The cam-shoulder 81 operates against the button on the lock in the same manner as the cam-shoulder 77 when the lock is opened to receive a holder.

The cut-out consists of a pair of rails 82, which are supported by the bracket 83 upon the frame and by means of the standard 84. These rails curve downwardly from the carrier, and their upper ends 85 receive the rib on the holder between them, and the shoulder 59 slides upon their upper edges to guide and remove the holder after it is unlocked from the carrier.

As the carrier revolves, the holders pass the trimming mechanism, which consists of a pair of rotary cutters 86 and stationary cutters 87. These cutters finish the ends of the leads which project from the sides of the holder, the rotary cutters first reducing them and the stationary cutters subsequently taking a finishing cut, thus leaving the leads completed and of the exact dimensions desired. The rotary cutters are similar, together with their adjusting and operating parts, and are of the following construction: A disk 88 (see Fig. 7) carries the cutting-tools 89, which are fastened by means of the nuts 90. This disk is mounted upon a horizontal shaft 91, which is journaled on the supports 92, depending from the carriage 93. This carriage slides upon the beveled track 94, which depends from the horizontal plate 95 and is moved by the screw 96, which is turned by the handle 97. This screw works on the lug 98 on the upper side of the track-plate. The carriage is adjusted in a horizontal plane and is fastened to the track-plate by means of the bolts 99, working in the slots 100, and the adjusting-bolts 101, passing through the clips 102 on the sides of the track-plate. These adjusting-bolts impinge against the side of the carriage, and by screwing them in or out the carriage may be turned upon the pivot 103, (see Fig. 11,) thus alining the tools on the disk to their work. The shaft 91 is free to slide longitudinally in its bearings, and the tools may be minutely adjusted to their work by turning the thumb-screws 104, which pass through the bracket 105 on the side of the carriage. An auxiliary shaft 106 slides horizontally in the brackets 107 on the side of the carriage and carries an arm 108, which is fastened thereto by the screw 109. The end of the auxiliary shaft carries a slotted arm 110, which engages a circular plate 111, carried by the disk 88 and fastened thereto by means of the nut 112. The slotted arm 110 is held to the circular plate by means of the pin 113, which passes freely through the arm 110 and one of the journal depending supports 92. Said pin is fastened to the latter by means of the set-bolt 114. The shaft 91 carries the drive-pulley 115, by which the disk carrying the cutting-tools is revolved. Slots 116 are also provided, through which a belt is passed around the pulley to drive the same.

The stationary cutters consist of a pair of knife-blades 117 and are adjusted by parts which are similar in construction. Each knife-blade and its adjusting mechanism consists of a knife pivoted at 118 on a carriage 119, said carriage being adapted to slide on the beveled track 120, which is fastened to the frame of the machine. The carriage is moved horizontally by the screw 121 and its handle 122 and is locked, when adjusted, by the bolts 123. The knife is turned upon the pivot 118 to adjust its edge to the work by means of the bolts 124. The tools on the rotary disks and the stationary knives face the contiguous ends of the leads on the holders. The carrier-plate revolves between the gibs 125, carried by the frame, to prevent any unevenness of travel, and the tools are directly opposite each other, so that the leads on the holders are cut by each pair of tools at exactly the same time to prevent uneven motion of any of the working parts.

In brief, the operation of this machine is as follows: The holders as they are received with a stack of short pieces of leads clamped therein are passed down the guide 25 and placed in the justifier, which is carried by the feeder. As the carrier revolves, the cam 48 swings the feeder from the broken to the full line position shown in Fig. 1. The cam-shoulder 77 then opens one of the locks and the holder is placed by the feeder on the carrier with its shoulder 24 resting against the shaft 67 and the rib passed into the lock. As the carrier continues revolving the lock is closed by the button 76 sliding off of the cam-shoulder to grip the rib of the holder. The rotary cutters and the stationary knives then trim and finish the ends of the leads. After passing the stationary knives the locks are opened automatically by the cam-shoulder 81, and the cut-out guides the holders as they are unlocked from the carrier onto the track, down which they subsequently slide and may be received by an attendant. Should by chance one of the locks fail to open, the holder remains in the feeder until another flat peripheral face of the carrier is turned to receive the same.

The justifier may be of any suitable dimensions and the guides 26 adjusted to receive holders containing leads of different lengths.

It is obvious that equivalent parts may be substituted for the elements described in this specification without departing from the principles which I have applied, and I do not wish to confine myself to the exact construction described.

Having described my invention, what I claim as new, and desire to protect by Letters Patent, is—

1. A machine for finishing printers' leads, consisting of a carrier, a holder for the leads to be finished, means for attaching said holder to said carrier, trimming mechanism in the path of the holder on said carrier for finishing the edges of such leads, a cut-out, and actuating mechanism.

2. A machine of the class set forth, consisting of a carrier, a holder for the leads to be finished, means for feeding said holder to said carrier, means on said carrier for gripping said holder, trimming mechanism in the path of said holder for cutting the edges of such leads, and actuating mechanism.

3. A machine of the class set forth, consisting of a holder for a stack of leads to be finished, a carrier, means for placing said holder on said carrier, trimming mechanism in the path of said holder for cutting the edges of such leads, a cut-out in the path of said holder to remove said holder from said carrier, and actuating mechanism for said parts.

4. A machine of the class set forth, consisting of a carrier, a holder for the leads to be finished, a lock on said carrier, means for automatically closing said lock to grip said holder, feed mechanism, trimming mechanism, means for automatically opening said lock to release said holder, a cut-out, and actuating mechanism.

5. A machine of the class set forth, consisting of a carrier, a plurality of locks on said carrier, holders for the leads to be finished, means for feeding said holders successively to said carrier, means for successively closing said locks to grip said holders, trimming mechanism, means for successively opening said locks to release said holders, cut-out mechanism, and actuating mechanism.

6. A machine of the class set forth, consisting of a suitable frame, a carrier journaled on said frame, a feeder adjoining said carrier, a holder for a stack of pieces of material to be finished adapted to be placed on said carrier by means of said feeder, a lock on said carrier, means for closing said lock to grip said holder, trimming mechanism in the path of said holder for finishing the edges of such leads, means for opening said lock to release said holder, a cut-out in the path of said holder to remove said holder from said carrier, and actuating mechanism for said parts.

7. A machine of the class set forth, comprising, in combination, a carrier provided with a plurality of faces, a series of holders for stacks of leads to be finished, each holder being provided with a rib, means for feeding said holders to said carrier successively and placing one holder on each face thereof, means for gripping the ribs of said holders on the faces of said carrier, means for trimming the leads carried by said holders, a cut-out for removing the holders successively from the carrier, and actuating mechanism for said parts.

8. A machine of the class set forth, comprising, in combination, a carrier provided with a plurality of flat, peripheral faces, a series of holders for the material to be finished, each holder having a rib, means for feeding said holders to said carrier and placing one holder on each of said faces, means for gripping the ribs of said holders on said carrier, a cut-out for removing said holders from said carrier, and actuating mechanism for said parts.

9. A machine of the class set forth, consisting of a carrier-plate adapted to revolve continuously having flat, peripheral faces, a lock adjoining each peripheral face of said plate, a plurality of holders for the leads to be finished, a suitable supporting-frame, a feeder swung from said frame, means for reciprocating said feeder to place a holder on each peripheral face of said plate, means for tripping said locks to receive and grip said holders, a plurality of cutters arranged in pairs, between which said holders are passed by said carrier, a cut-out, and actuating mechanism.

10. A machine of the class set forth, consisting of a carrier-plate having a plurality of flat, peripheral faces, a lock on said plate contiguous to each peripheral face, a plurality of holders for stacks of leads to be finished, a supporting-frame upon which said carrier-plate is journaled, a feeder pivoted on said frame, a justifier pivoted between its ends on said feeder, a resilient support between each end of said justifier and said feeder, means for tripping said locks to receive and grip said holders, and means for revolving said carrier and reciprocating said feeder.

11. A machine of the class set forth, consisting of a carrier having a plurality of flat, peripheral faces, a frame upon which said carrier is journaled, a lock adjoining each peripheral face of said carrier, means for opening said locks by hand, a plurality of holders for stacks of leads to be finished, a feeder for placing said holders successively on the peripheral faces of said plate, a justifier carried by said feeder, a retainer in the path of said justifier to prevent said holders leaving the same until the locks on said carrier have gripped the same, means for tripping said locks to receive and grip said holders, means for again tripping said locks to release said holders, and actuating mechanism.

12. A machine of the class set forth, consisting of a carrier having a plurality of flat, peripheral faces, a journal-support on which said carrier is adapted to revolve, a spring-lock adjoining each of said faces of said carrier, a plurality of holders for stacks of leads to be finished, a plurality of cutters past which such leads are carried, means for automatically opening said lock to receive and grip a holder at a time, means for again opening said lock to release said holder, a cut-out for removing the holders after they have been unlocked, and actuating mechanism for revolving said carrier and operating said parts.

13. A machine of the class set forth, consisting of a carrier having a plurality of flat, peripheral faces, a journal-support on which said carrier is adapted to revolve, a lock on said carrier adjoining each of said peripheral faces, a holder for a stack of leads to be finished, said holder having a rib adapted to be gripped by said lock and a clamp for holding a stack of leads to be finished, means for tripping said lock to receive and grip said rib, means for again tripping said lock to release said rib, trimming mechanism, a cut-out for removing said holder after it has been unlocked, and actuating mechanism.

14. A machine of the class set forth, consisting of a carrier having a plurality of clamps, a journal-support on which said carrier is adapted to revolve, a lock adjoining each segment of said carrier, a plurality of holders having means for clamping a stack of pieces of material to be finished and ribs formed with stop-shoulders to impinge against said locks, means for opening and closing the locks to receive and grip the ribs on said holders, a plurality of cutters between which the stacks of pieces of material are passed, means for again opening the locks to release said holders, a cut-out for removing said holders after they have been unlocked, and actuating mechanism.

15. A machine of the class set forth, consisting of a carrier having a plurality of flat, peripheral faces, a plurality of holders for stacks of pieces of material to be finished, a feeder for placing said holders successively on said faces of said carrier, a plurality of locks on said carrier for gripping said holders, a justifier carried by said feeder, a retainer for said holders in the path of said justifier, means for opening and closing said locks, a plurality of trimmers, a pair of rails for removing said holders as they are unlocked, and actuating mechanism.

16. A machine of the class set forth, consisting of a carrier having a plurality of flat, peripheral faces, a plurality of holders for clamping stacks of leads to be finished, a feeder for placing said holders successively on said faces, a justifier carried by said feeder, a spring-retainer in the path of said justifier, a plurality of locks on said carrier, means for closing and opening said locks to grip and release said holders, means for opening said locks by hand, pairs of trimmers between which such stacks of leads are passed, a cut-out for removing said holders after they have been unlocked, and actuating mechanism.

17. A machine of the class set forth, consisting of a carrier having a plurality of flat, peripheral faces, a journal-support for said carrier, a plurality of holders for clamping stacks of leads to be finished, a feeder for placing said holders successively on said faces, a plurality of locks on said carrier, means for successively closing and opening said locks to grip and release said holders, pairs of trimmers between which such leads are passed, a cut-out for removing said holders after they have been unlocked, and means for actuating said parts.

18. A machine of the class set forth, consisting of a carrier having a plurality of flat, peripheral faces, a journal-support for said carrier, a plurality of holders for clamping stacks of leads to be finished, a feeder for placing said holders successively on said faces, a plurality of locks on said carrier, means for successively closing and opening said locks to grip and release said holders, pairs of cutters between which the stacks of leads are carried, a cut-out for removing said holders after they have been unlocked, and means for actuating said parts.

19. A machine of the class set forth, consisting of a carrier having a plurality of flat, peripheral faces, a journal-support for said carrier, a plurality of locks adjoining said faces, a plurality of holders for stacks of pieces of material to be finished, a feeder for placing said holders successively upon said faces, a cam-shoulder by which said locks are caused to close and grip said holders, another cam-shoulder by which said locks are opened to release said holders, a cut-out for removing said holders as they are released by said locks, and actuating mechanism.

20. A machine of the class set forth, consisting of a vertical carrier-plate having a plurality of flat, peripheral faces, a plurality of spring-locks on said carrier-plate, a pair of cam-shoulders by which said locks are successively opened, a plurality of holders for stacks of pieces of material to be finished, a feeder by which said holders are placed successively upon said peripheral faces of said carrier to be gripped by said locks after they have been opened by one of said cam-shoulders, a cut-out by which said holders are removed as the locks are opened by the other cam-shoulder, trimmers between which the stacks of pieces of material are passed, and actuating mechanism.

21. A machine of the class set forth, consisting of a carrier having a series of flat, peripheral faces, a plurality of spring-locks on said carrier, a frame on which said carrier is journaled, a feeder, a plurality of holders for stacks of pieces of leads, means for reciprocating said feeder to place said holders successively upon the peripheral faces of said carrier, a cam by which said locks are successively opened to grip said holders, a feedway adjoining said feeder, a retainer by which the holders are prevented from leaving the feeder until gripped by said locks, means for limiting the return movement of said retainer, another cam by which said locks are opened to release said holders, and actuating mechanism.

22. A machine of the class set forth, consisting of a vertical carrier-plate having a plurality of flat, peripheral faces, a plurality of locks, one for each peripheral face of said carrier-plate, a frame upon which said carrier-plate is journaled, a feeder pivoted upon said frame, a plurality of holders for stacks of pieces of material, means for reciprocating said feeder to place the holders successively upon the peripheral faces of said carrier, means for opening and closing said locks successively to receive and grip said holders, a spring-retainer to prevent the holders leaving the feeder until engaged by said locks, a stop for limiting the return movement of said retainer, a feedway for the holders adjoining said feeder, a pair of guides on said feedway, means for adjusting the distance between said guides, means for opening said locks to release said holders, and means for revolving said carrier and reciprocating said feeder.

23. A machine of the class set forth, consisting of a vertical carrier-plate having a plurality of flat, peripheral faces, a frame upon which said carrier-plate is suitably journaled, a lock adjoining each peripheral face of said carrier-plate, a feeder pivoted upon said frame, a justifier carried by said feeder, a plurality of holders for stacks of pieces of material adapted to be placed successively by said feeder upon the peripheral faces of said plate, means for successively opening said locks to receive and grip said holders, a retainer pivoted upon said frame to prevent said holders leaving said feeder after they have been gripped by said locks, a spring impinging against said retainer, a stop for limiting the return movement of said retainer, a feedway adjoining said feeder, a pair of guides on said feedway, means for adjusting the distance between said guides, means for again opening said locks to release said holders, and means for revolving said carrier and reciprocating said feeder.

24. A machine of the class set forth, consisting of a carrier having a plurality of flat, peripheral faces, a frame upon which said carrier is journaled, a plurality of spring-locks adjoining the peripheral faces of said carrier, a plurality of holders for stacks of pieces of material to be finished, a feeder pivoted upon said frame, a cam for successively opening said locks to receive and grip said holders, a justifier pivoted between its ends upon said feeder, a spring-support below each end of said justifier, a retainer pivoted upon said frame to prevent said holders leaving said justifier before they are gripped by said locks, a spring impinging against said holder to return it to normal position, a stop for limiting the return movement of said retainer, a feedway adjoining said feeder, a pair of guides on said feedway, means for adjusting the distance between said guides, a cam for opening said locks to release said holders, and drive mechanism for revolving said carrier and reciprocating said feeder.

25. A machine of the class set forth, consisting of a carrier having a plurality of flat, peripheral faces, a plurality of spring-locks adjoining said peripheral faces, a frame upon which said carrier is journaled, a feeder pivoted upon said frame, a plurality of holders for stacks of pieces of material to be finished, means for reciprocating said feeder to place said holders successively upon the peripheral faces of said plate, means for tripping said locks to grip said holders, a justifier carried by said feeder, a retainer for preventing the holders leaving said feeder until they have been gripped by said locks, a stop near the pivot end of said feeder, a feedway adjoining said feeder, means for again tripping said locks to release said holders, and means for revolving said carrier.

26. A machine of the class set forth, consisting of a carrier-plate having a plurality of flat, peripheral faces, a frame upon which said carrier-plate is journaled, a spring-lock adjoining each peripheral face of said plate, a plurality of holders having clamps for holding stacks of pieces of material, ribs below said clamps, stop-shoulders formed upon said ribs, means for tripping said locks to grip the ribs on said holders, means for again opening said locks to release said holders, and actuating mechanism.

27. A machine of the class set forth, consisting of a carrier having a plurality of flat, peripheral faces, a journal-support for said carrier, holders for stacks of leads to be finished, means for successively feeding and fastening said holders on said peripheral faces, trimming mechanism past which such stacks of leads are passed, and means for revolving said carrier.

In testimony whereof I have signed my name to this specification in the presence of two subscribing witnesses.

CYRUS C. WEBSTER.

Witnesses:
E. M. BOESEL,
F. G. BRADBURY.